(No Model.) 2 Sheets—Sheet 1.

F. FOWLER.
VELOCIPEDE WAGON.

No. 247,754. Patented Oct. 4, 1881.

Witnesses:
Floyd Norris
Philip F. Larner

Inventor:
Francis Fowler
by Johnson and Johnson
Attys (No Model.) 2 Sheets—Sheet 2.
F. FOWLER.
VELOCIPEDE WAGON.
No. 247,754. Patented Oct. 4, 1881.
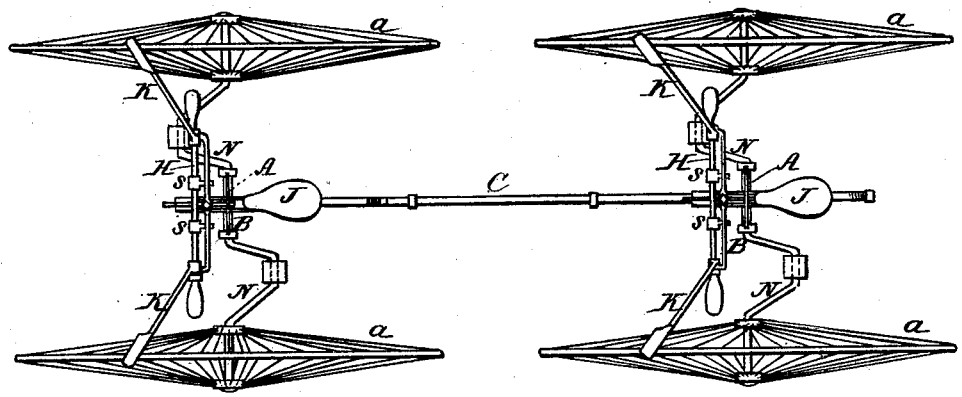
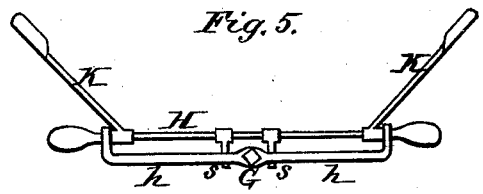
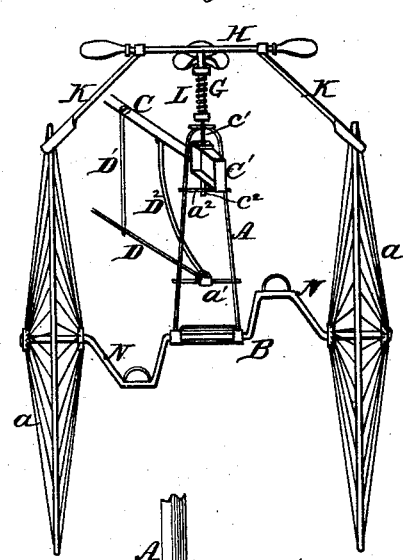
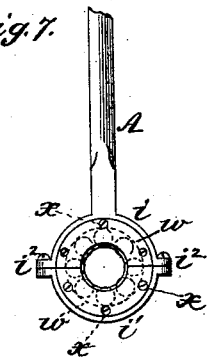
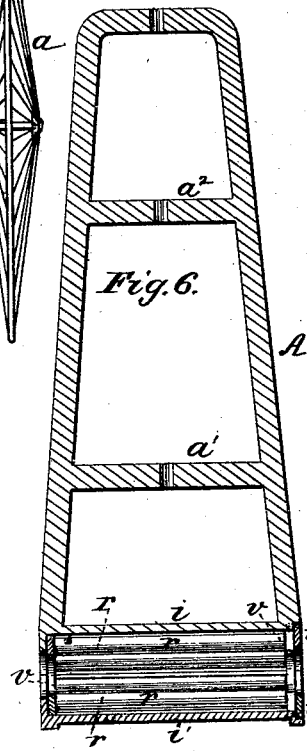
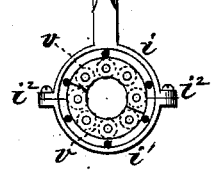
Witnesses:
Floyd Norris
Philip F. Larner
Inventor:
Francis Fowler
by Johnson and Johnson
Attys

UNITED STATES PATENT OFFICE.

FRANCIS FOWLER, OF NEW HAVEN, CONNECTICUT.

VELOCIPEDE-WAGON.

SPECIFICATION forming part of Letters Patent No. 247,754, dated October 4, 1881.

Application filed November 9, 1880. (No model.)

*To all whom it may concern:*

Be it known that I, FRANCIS FOWLER, a citizen of the United States, residing at New Haven, in the county of New Haven and State of Connecticut, have invented new and useful Improvements in Velocipede-Wagons, of which the following is a specification.

My invention is directed to the production of a velocipede-wagon in which more than one person can ride, and in which each rider performs his part in driving.

In carrying out this object I use a double driving and guiding part of two wheels each, one part in front of the other and connected by a central seat-bearing trestle composed of top and bottom braced stringers, and in which the riders operate separate crank-axles by the action of their feet upon oppositely-arranged cranks provided with foot-rests, the braced stringers serving to rigidly connect the vertical forks and steering-posts of each driving part and to form a carrying-frame.

Figure 1:
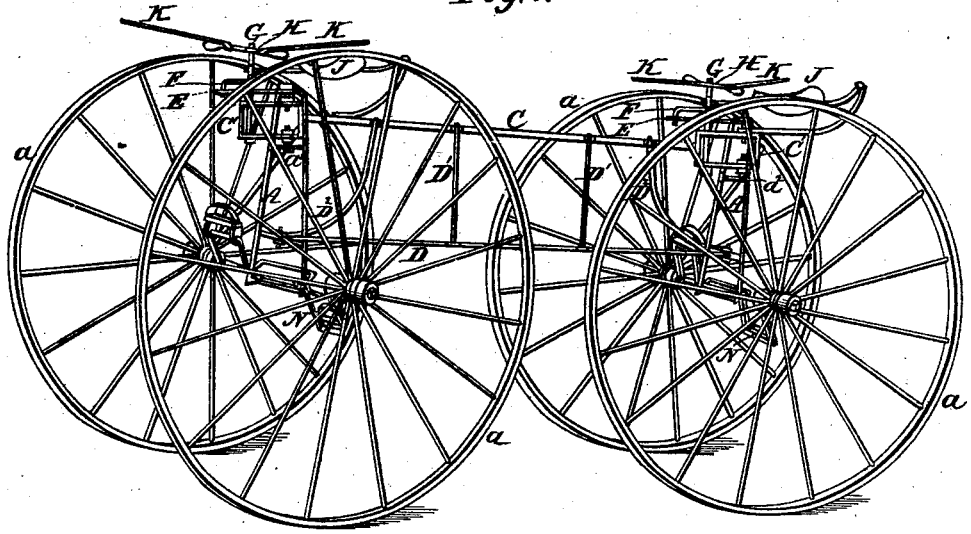
Figure 2:
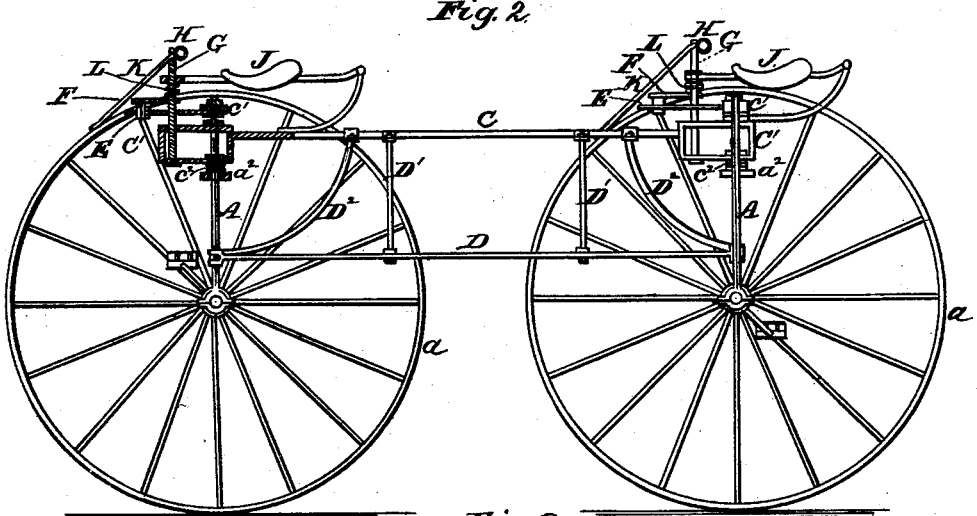
Figure 9:
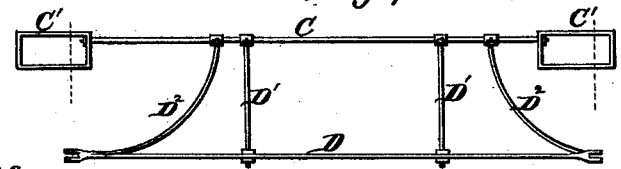

Referring to the accompanying drawings, Figure 1 represents a view, in perspective, of a velocipede-wagon embracing my invention; Fig. 2, a vertical longitudinal section of the same; Fig. 3, a top view; Fig. 4, a front view of the same; Fig. 5, a top view of the steering-bar with its brake-arms; Fig. 6, the yoke-frame or "fork," with its connected anti-friction roll-box; Figs. 7 and 8, details of said fork and anti-friction roll-box, and Fig. 9 the seat-bearing trestle or carrying-frame of the double driving and guiding wheeled parts.

The driver parts of my velocipede-wagon consist each of two wheels, $a\ a$, each from four to seven feet in diameter, mounted upon separate axles B, each driven by the action of the rider's feet upon oppositely-arranged cranks N N, provided with foot-rests, and in which said wheels are also adapted as the steering-wheels, and controlled as such, by the independent action of the riders seated upon each driving part, by means of a yoke-frame or fork, A, mounted upon each axle between the foot-rests. Such driving part may be of any suitable construction as to its adaptation for both driving and steering; but I prefer that shown in a patent granted to me May 11, 1880, No. 227,511, in which a free lever action is obtained upon the yoke-frame or fork to facilitate the steering of the driven or traction wheels, and in which the wheel-hubs are provided with ratchet or clutch connections with the crank-shafts, to allow the wheels to revolve independently of the axle in making turns. The details of these parts it is deemed unnecessary to embrace herein, either as to their illustration or description, as they are specifically presented in my said patent, and may be used as therein described with my present improvements.

Each driving part consists of two wheels, a double-cranked axle and a yoke-frame mounted thereon, and through which the wheels are turned in guiding the wagon. These distinct driving parts are connected, one behind the other, by a horizontal central rod or tube, C, passing through the upper part of each yoke-frame, and terminating in an open part, C', at each end, which is pivoted within the top of each yoke-frame, and forms the top of a trestle of stringers, C and D, connected by vertical intermediate braces, D', the lower stringer, D, being pivoted or jointed to cross-bars $a'$ of the yoke-frames, from which point curved or oblique braces $D^2$ connect with the top stringer, making a strong connecting and seat-bearing trestle for the driving parts.

The connection of the braced trestle with the yoke-frames or forks forms a firm supporting structure for the seats and the guiding-posts, and in which the end braces, $D^2$, serve to support the trestle-connections against endwise concussions and prevent all longitudinal vibration or swaying of the seat-bearing parts.

The seats for the riders are mounted upon the top stringer, C, and each has a position thereon in rear of the driving-axles. The open ends of the top stringer extend in front of the driving-axles, and are pivoted to the yoke-frames between their tops and cross-bars $a^2$ by steel-pointed screw-bolts $c'\ c^2$, upon which said yoke-frames are turned to guide the driven wheels, and which is effected by a construction specially designed to turn quickly and with the least power. For this purpose the steering-post G of each driving part has a lever-connection with the trestle and with the yoke-frames. The steering-posts are supported in the open ends of the trestle in front of the driving-axles and the seats, and are provided with hand steering-bars H, adapted to be partially rotated in bearing-arms of said posts.

Each yoke-frame has a fixed lever-arm, E, extending frontward over the open trestle ends, and provided with a radial slot, within which works a crank-arm, F, extending frontward from and fixed to the steering-post, so that by turning the steering-posts the united action of the yoke-lever arms and the post crank-arms co-operate to bring the steering of each driving part within easy and immediate control of the riders, as fully described in my said patent.

To allow the wagon to make turns, and the driving parts to serve also the guiding parts, the wheels have ratchet or clutch connections with the crank-axles, and they are fitted to turn loosely thereon, being each provided with a ratchet-hub part, which matches with a sleeved ratchet part on the axle, and which is adapted to have a sliding movement thereon, but fixed to turn with the axle, so that while such ratchet or clutch connections drive the wheels they allow the latter to revolve independently of the axle in making turns, as in my said patent.

The saddles or seats may be arranged in any suitable manner; but I prefer that shown, in which the seat-support embraces the steering-post and rests upon a spring, L, so as to bring the rider nearly if not quite over the yoke-frame, and also allow of the adjustment of the seat to suit riders having different lengths of legs, by using a longer or shorter spring-rest for the seat-post connection and suit the sweep of the crank foot-rests.

For checking the speed of the wagon I employ brake-arms K, rigidly attached to the hand steering-bar H, and extending therefrom preferably in oblique positions over the wheels in advance of the steering-post; but they may be placed to act upon the wheels in rear of said post. These brake-arms are provided with suitable pads, and are brought down upon the wheels by turning the bar H in its post-bearings, and when they are released from contact with the wheels they are held free of them by springs $s\ s$, attached to said bar H, and resting under the bearing-arms $h$ of the post, which carry the steering-bar, as shown in Fig. 5.

In this wagon each rider drives his supporting part, and each can separately guide, or both together, to make short turns under high speed.

The velocipede-wagon is made preferably of steel, as light as possible with the required durability, and the wheels are provided with rubber tires. The yoke-frame or fork A is mounted upon the axle between the oppositely-arranged cranks, and its bearing thereon is formed by a connecting-box of anti-friction rolls. This box is formed in halves $i\ i'$, the upper one, $i$, of which is cast with and unites the lower ends of the fork, the half being provided with side flanges, $i^2$, by which they are bolted together. The bearing-rolls $r$ in the box are mounted in two half-rings, $v$, corresponding with the two half-boxes, and they are held in place between shoulders on the ends of the rolls and the ends of the box-halves. This construction allows the fork and its connected box to be easily applied to the axle between the cranks. The bearing-surface of the rolls may be recessed at intervals, or may be uninterrupted, as desired, and they serve to reduce the friction upon the axle and to give a smooth running. The divided rings keep the rolls separate, and hold them in place within the box, and allow them to be placed therein and upon the axle in half-cylinders, which are revolved together by and with the axle.

To afford facilities for removing the rolls for cleaning them, as well as the half-boxes, without removing the lower half-box, $r$, or the fork from the axle, I provide one end of the box with removable half-rings $w$, corresponding to the half-boxes and fitted in recesses therein, as shown in Figs. 6 and 7. The inner half-rings fit against these outer half-rings, and by removing the latter the inner half-rings, with their rolls, can be drawn out endwise, cleaned, and replaced with much less trouble than in removing the lower half-box and separating the fork from the crank-shaft. The other end of the box confines the inner half-rings at that end. The outer half-rings, $w$, are secured by screws $x$, and this end of the half-boxes is open the full diameter of the cylinder of rolls.

I claim—

1. The combination, in a velocipede-wagon, of the separate wheeled driving and guiding parts, each having an axle, B, provided with oppositely-arranged cranked driving foot-rests, a yoke or fork, A, mounted upon said axle between the cranks, a separate steering-post, C, supported by each yoke, and a seat, T, with a frame composed of an upper and a lower stringer, C D, forming a trestle having a pivoted connection at each end with the said axle-yokes, and arranged in vertical position between the wheels, the said stringers being connected and braced together and with the forks, substantially as described, for the purpose specified.

2. The combination, with the wheels $a\ a$ and the axle B, having oppositely-arranged cranks provided with operating foot-rests, of the steering-post bar H, provided with brake-arms K K, and the seat J, the said brake-arms extending obliquely from each end of said steering-bar, and depressed upon and released from the tops of said wheels by turning or oscillating said steering-bar in its bearings, substantially as described, for the purpose specified.

3. The combination, with the driven wheels, of the steering-bar H, provided with brake-arms rigidly attached thereto and adapted for operation, substantially as herein set forth.

4. In a velocipede, the brake-arms K, the steering-bar H, and the springs $s\ s$, carried by the steering-post G, in combination with wheels driven by oppositely-arranged cranks, and upon the tops of which said brakes are arranged to operate, substantially as herein set forth.

In testimony whereof I have hereunto set my hand in the presence of two subscribing witnesses.

FRANCIS FOWLER.

Witnesses:
AUSTIN B. FULLER,
GEORGE A. ISBELL.